United States Patent
Zhang et al.

(10) Patent No.: US 7,881,424 B2
(45) Date of Patent: Feb. 1, 2011

(54) METHOD FOR CALIBRATING DUAL-ENERGY CT SYSTEM AND METHOD OF IMAGE RECONSTRUCTION

(75) Inventors: Li Zhang, Beijing (CN); Zhiqiang Chen, Beijing (CN); Gnowei Zhang, Beijing (CN); Jianping Cheng, Beijing (CN); Yuanjing Li, Beijing (CN); Yinong Liu, Beijing (CN); Yuxiang Xing, Beijing (CN); Ziran Zhao, Beijing (CN); Yongshun Xiao, Beijing (CN)

(73) Assignees: Tsinghua University (CN); Nuctech Company Limited (CN)

( * ) Notice: Subject to any disclaimer, the term of this patent is extended or adjusted under 35 U.S.C. 154(b) by 0 days.

(21) Appl. No.: 12/075,463

(22) Filed: Mar. 11, 2008

(65) Prior Publication Data

US 2008/0310598 A1    Dec. 18, 2008

(30) Foreign Application Priority Data

Mar. 14, 2007   (CN) .......................... 2007 1 0643913

(51) Int. Cl.
*G01N 23/00* (2006.01)
(52) U.S. Cl. ............................................. 378/5; 378/54
(58) Field of Classification Search ............... 378/4–20, 378/207, 54
See application file for complete search history.

(56) References Cited

U.S. PATENT DOCUMENTS

2004/0184574 A1*  9/2004  Wu et al. ...................... 378/5
2005/0259781 A1* 11/2005  Ying et al. ..................... 378/5
2009/0129539 A1*  5/2009  Licato et al. ................... 378/5

* cited by examiner

*Primary Examiner*—Hoon Song
(74) *Attorney, Agent, or Firm*—Schwegman, Lundberg & Woessner, P.A.

(57) ABSTRACT

A method for calibrating a dual-energy CT system and an image reconstruction method are disclosed to calculate images of atomic number and density of a scanned object as well as its attenuation coefficient images at any energy level. The present invention removes the effect from a cupping artifact due to X-ray beam hardening. The method for calibrating a dual-energy CT system is provided comprising steps of selecting at least two different materials, detecting penetrative rays from dual-energy rays penetrating said at least two different materials under different combinations of thickness to acquire projection values, and creating a lookup table in a form of correspondence between said different combinations of thickness and said projection values. The image reconstruction method is provided comprising steps of scanning an object with dual-energy rays to acquire dual-energy projection values, calculating projection values of base material coefficients corresponding to said dual-energy projection values based on a pre-created lookup table, and reconstructing an image of base material coefficient distribution based on said projection values of base material coefficients. In this way, images of atomic number and density of an object as well as its attenuation coefficient images can be calculated from the images of the distribution of base material coefficients. Compared with the prior art technique, the method proposed in the present invention has advantages of simple calibration procedure, high calculation precision and invulnerability to X-ray beam hardening.

6 Claims, 4 Drawing Sheets

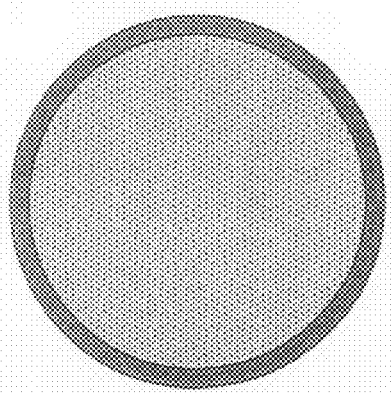
Fig. 4
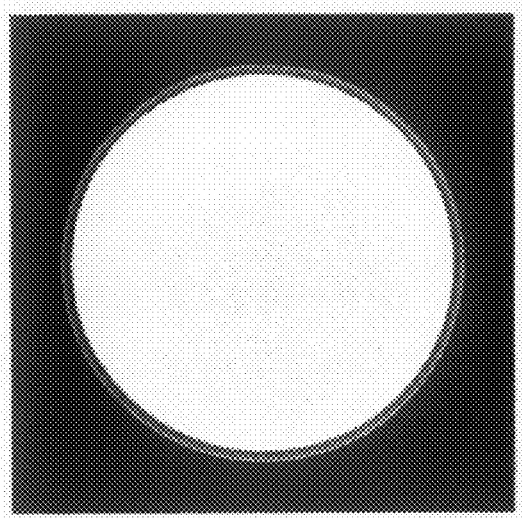 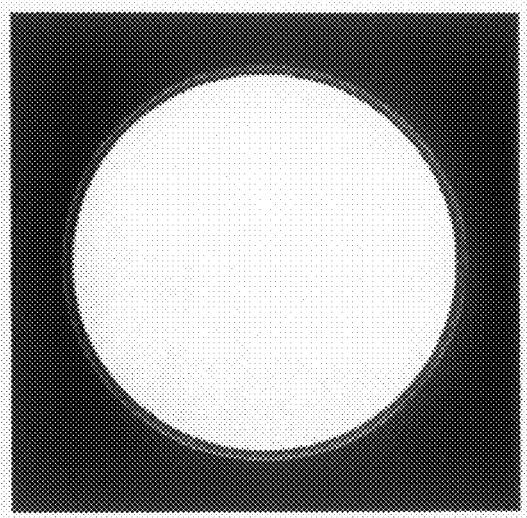
Fig. 5A Fig. 5B
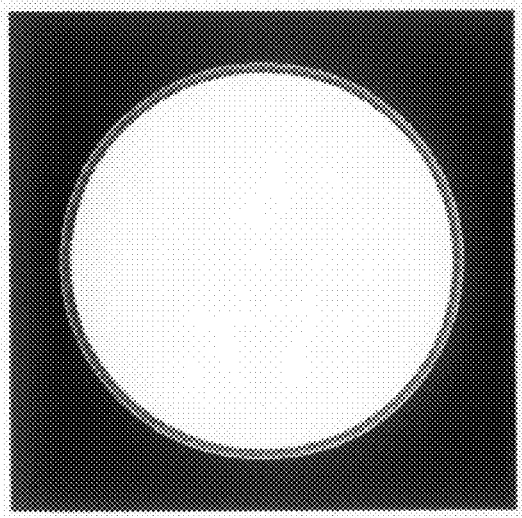 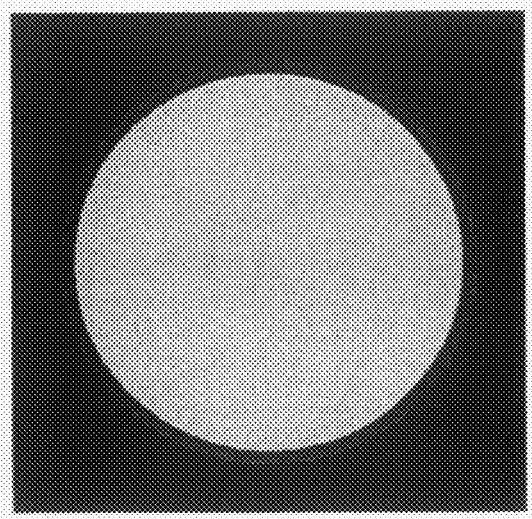
Fig. 5C Fig. 5D

US 7,881,424 B2

METHOD FOR CALIBRATING DUAL-ENERGY CT SYSTEM AND METHOD OF IMAGE RECONSTRUCTION

RELATED APPLICATIONS

This application claims the benefit of priority, under 35 U.S.C. Section 119, to Chinese Patent Application Ser. No. 2007100643913, filed on Mar. 14, 2007, which is incorporated herein by reference in its entirety.

BACKGROUND OF THE INVENTION

1. Field of Invention

The present invention relates to radiography technology, in particular to a method for calibrating a dual-energy CT system and a corresponding image reconstruction method, which can eliminate a cupping artifact caused by X-ray beam hardening.

2. Description of Prior Art

As technology progresses, Computerized Tomography (CT) technique has been applied to systems for inspecting tourists' luggage. In the widely-used CT technique, an X-ray is utilized as a ray source which generates X-rays of continuous energy distribution. An image obtained by the conventional image reconstruction method represents the attenuation coefficient distribution of an object, which will give rise to a cupping artifact if affected by X-ray beam hardening.

In the existing algorithm of dual-energy CT image reconstruction, images of high- and low-energy attenuation coefficients for an object are first acquired using a conventional CT reconstruction method, and then calculation is made to obtain density and atomic number images. Such existing method cannot eliminate the cupping artifact due to hardening of rays and thus results in an inaccurate calculation result as well as reduced accuracy in material identification.

SUMMARY OF THE INVENTION

The present invention is made to address the above problems. One object of the present invention is to provide a method for calibrating a dual-energy CT system and an image reconstruction method. In the present invention, a dual-energy lookup table can be obtained by selecting base materials, fabricating a step-shaped block and rectangular blocks having a series of thickness and measuring projection values under different combinations of thickness, in order to implement system calibration. Further, after the calibration of the dual-energy CT system utilizing two types of base materials, a dual-energy CT reconstruction algorithm can be adopted to acquire images of atomic number and density of an object as well as its attenuation coefficient images at any energy level.

According to an aspect of the present invention, a method for calibrating a dual-energy CT system is provided comprising the steps of selecting at least two different materials, detecting penetrative rays from dual-energy rays penetrating the at least two different materials under different combinations of thickness to acquire projection values, and creating a lookup table in a form of correspondence between the different combinations of thickness and the projection values.

Preferably, the dual-energy rays comprise low- and high-energy rays.

Preferably, the low- and high-energy rays are X-rays.

Preferably, the at least two different materials comprises carbon and aluminum.

According a further aspect of the present invention, an image reconstruction method is provided comprising steps of scanning an object under inspect with dual-energy rays to acquire dual-energy projection values, calculating projection values of base material coefficients corresponding to the dual-energy projection values based on a pre-created lookup table, and reconstructing an image of base material coefficient distribution based on the projection values of base material coefficients.

Preferably, the image reconstruction method further comprises a step of calculating the atomic number image of the object based on the image of base material coefficient distribution.

Preferably, the image reconstruction method further comprises a step of calculating the characteristic density image of the object based on the image of base material coefficient distribution.

Preferably, the image reconstruction method further comprises step of calculating the attenuation coefficient image of the object based on the image of base material coefficient distribution.

Preferably, the lookup table is created by selecting at least two different materials, detecting penetrative rays from dual-energy rays penetrating the at least two different materials under different combinations of thickness to acquire projection values, and creating a lookup table in a form of correspondence between the different combinations of thickness and the projection values.

Compared with the prior art technique, the method proposed in the embodiments of the present invention has advantages of simple calibration procedure, high calculation precision and invulnerability to X-ray beam hardening.

Images reconstructed by the method in accordance with the embodiments of the present invention can serve as evidence in determining substance properties in security inspection in order to improve accuracy of security inspection.

Image reconstruction results obtained by the method of the present invention have a higher precision, and the resulting atomic number and density values each have an error within 1% according to simulation results.

According to the present invention, it is possible to acquire the attenuation coefficient image of the object at any energy level with no effect from X-ray spectrum hardening.

BRIEF DESCRIPTION OF THE DRAWINGS

The above advantages and features of the present invention will be apparent from the following detailed description taken conjunction with the drawings in which:

FIG. 4 is a schematic cross-sectional diagram of an organic glass bottle full of water;

FIG. 5 shows resulting images reconstructed by the prior art method and by the method of the present invention, in which FIG. 5A is a low-energy attenuation coefficient image reconstructed by a conventional method, FIG. 5B is attenuation coefficient image at 60 keV obtained by the image reconstruction method of the present invention, and the display gray windows for the images in FIGS. 5A and 5B are [0.12 0.21]; FIG. 5C is a characteristic density image reconstructed by the method of the present invention, with a display gray window of [0.6 1.12]; FIG. 5C is an atomic number image reconstructed by the method of the present invention, with a display gray window of [6 8]

DETAILED DESCRIPTION OF THE PREFERRED EMBODIMENTS

Figure 1:
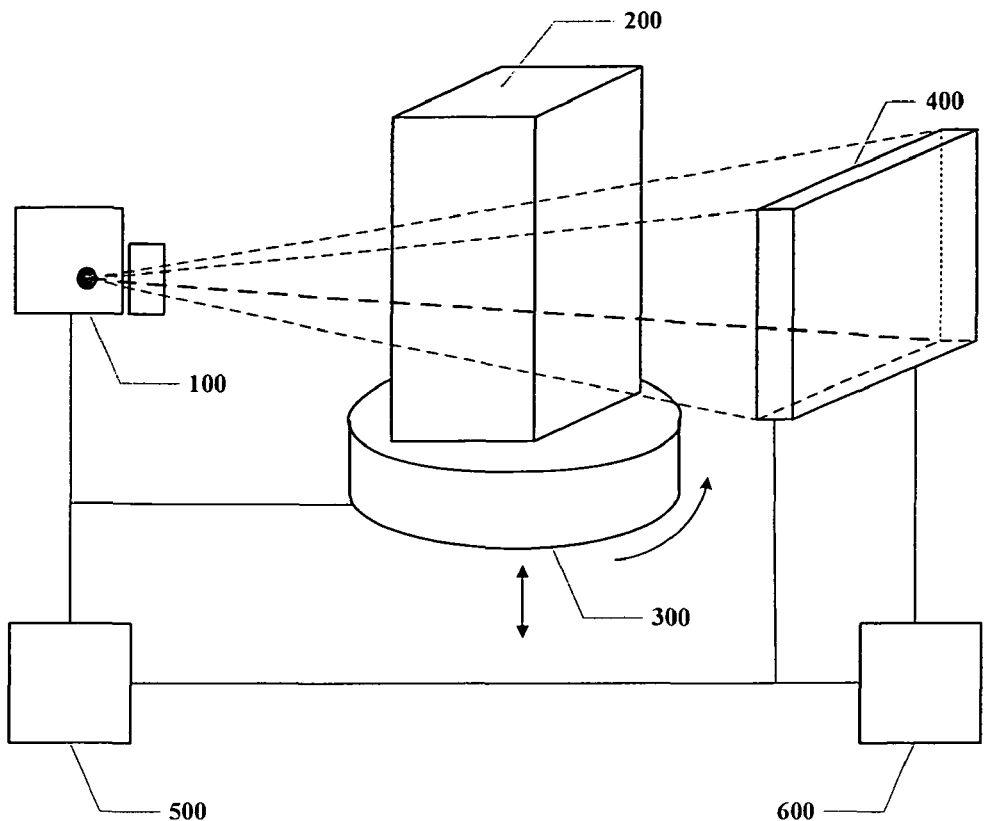
FIG. 1 is a schematic diagram of a dual-energy CT system according to an embodiment of the present invention.

Now, a detailed description will be given to the preferred embodiments of the present invention with reference to the figures, throughout which like reference signs denote identical or similar component, though illustrated in different figures. For clarity and conciseness, specific description of any known function or structure incorporated here will be omitted otherwise the subject of the present invention may be obscured.

Mathematic Principle for CT

Subjecting a 2D distribution u(x,y) to line integration along a direction $\theta$ will result in a 1D function $p_\theta(t)$ which is referred to as the projection of u(x,y) at an angle of $\theta$. If the projection $p_\theta(t)$ along all directions can be obtained, the 2D distribution u(x,y) can be calculated accurately based on Radon transformation. The procedure of deriving a 2D distribution from its projection is called reconstruction, which acts as the mathematic principle for CT.

In practice, after an X-ray and a detector go round an object for one cycle, there measured and obtained the projections of the attenuation coefficient distribution along all directions for some slice of the object, and the 2D distribution of attenuation coefficients of the object slice can be reconstructed on the basis of the CT principle.

Base Material Decomposition Model

Within an energy range (<200 keV) involved in a small-sized X-ray security inspection system, the linear attenuation coefficient of a material can be approximated with the following analytic expression (1):

$$\mu(E) = a_1 f_P(E) + a_2 f_{KN}(E) \quad (1)$$

$$a_1 = \frac{\rho Z}{M} Z^n \quad (2)$$

$$a_2 = \frac{\rho Z}{M} \quad (3)$$

In which $f_P(E)$ represents variation in photoelectric effect cross section over different energy levels, $f_{KN}(E)$ represents variation in Compton scatter cross section over different energy levels, and each of $f_P(E)$ and $f_{KN}(E)$ has a known analytic expression. Further, variables $a_1$ and $a_2$ depend on the atomic number, mass number and density of the material and are expressed as (2) and (3), respectively, with Z denoting atomic number, M denoting mass number, $\rho$ denoting density (g/cm$^3$), and n is a constant.

Since the linear attenuation coefficient of each material can be uniquely determined by the two coefficients, $a_1$ and $a_2$, in the expression (1), two base materials, such as carbon and aluminum, can be selected so as to represent the linear attenuation coefficient of any other material with a linear combination of the linear attenuation coefficients of these base materials, as illustrated in the expression (4):

$$\mu(E) = b_1 \mu_1(E) + b_2 \mu_2(E) \quad (4)$$

In which $\mu(E)$ denotes the linear attenuation coefficient of one arbitrary material of an object under inspect, $\mu_1(E)$ and $\mu_2(E)$ are the linear attenuation coefficients of the selected base material, $b_1$ and $b_2$ are called base material coefficients.

Following the expression (5), the characteristic density is defined as a product of density and a ratio between atomic number multiplied by 2 and mass number:

$$\rho^* = \rho \frac{2Z}{M} \quad (5)$$

Given that the atomic numbers and characteristic densities of the two base material are $(Z_1, \rho^*_1)$ and $(Z_2, \rho^*_2)$, respectively, the atomic number and characteristic density of any other material can be derived from the above expressions (1)~(4), as illustrated by the expressions (6) and (7):

$$\rho^* = b_1 \rho^*_1 + b_2 \rho^*_2 \quad (6)$$

$$Z = \left( \frac{b_1 \rho^*_1 Z_1^n + b_2 \rho^*_2 Z_2^n}{b_1 \rho^*_1 + b_2 \rho^*_2} \right)^{1/n} \quad (7)$$

Base Material Projection Model

The X-ray tube generally creates an energy spectrum as a continuous spectrum, and the energy response function of the detector to X-rays is not constant. Given as the product of energy spectrum and energy response function, and being normalized as $$\int_0^{E_m} S(E) dE = 1 \quad (8)$$

the projection value along a projection line is expressed as the following integral:

$$p = -\ln \frac{I}{I_0} = -\ln \int_0^{E_m} S(E) \exp\left(-\int_l \mu(E, x, y) dl\right) dE \quad (9)$$

in which $I_0$ and I represent the read values of the detector before and after the attenuation of rays by the object, respectively, $E_m$ represents the maximum energy of the rays, and l represents the path the rays travel through.

The expression (9) reveals the relation between the projection value p measured actually by the system and the 2D distribution $\mu(x,y)$. It is obvious that, due to the polyenergetic characteristic of X-rays, the expression (9) does not represents the line integral of $\mu(x,y)$ along a line and thus cannot satisfy the mathematic principle for CT. Since the conventional reconstruction algorithm neglects such inconsistence, the reconstructed image for $\mu(x,y)$ contains a cupping artifact referred to as beam hardening artifact.

The typical existing dual-energy CT method first utilizes the conventional reconstruction algorithm to acquire two sets of $\mu(x,y)$, and then calculates such information as atomic number and density. Such method cannot remove the effect imposed by the polyenergetic characteristic of rays. In contrast, the present invention addresses this problem with the concept of base material decomposition.

Substituting a base material decomposition model into the expression (9) results in a projection value based on base material coefficient, which is expressed as:

$$p = -\ln \int_0^{E_m} S(E) \exp\left(-\int_l [\mu_1(E) b_1(x,y) + \mu_2(E) b_2(x,y)] dl\right) dE \quad (10)$$

The integration along the path l in the expression (10) can be written into the expressions (11) and (12):

$$\int_l b_1(x,y) dl = B_1 \quad (11)$$

$$\int_l b_2(x,y) dl = B_2 \quad (12)$$

In this way, $B_1$ and $B_2$ are called projection values of base material coefficients according to the definition of the expressions (11) and (12). Assume that we have acquired complete project values from all angles for these base material coefficients, the distribution of the base material coefficients $b_1$ and $b_2$ can be obtained according to the CT reconstruction theory, and thus the distribution of atomic number and characteristic density of the object as well as the linear attenuation coefficient at any energy level can be calculated from the base material decomposition model.

Calculation of Projection Values of Base Material Coefficient

Having acquired the projection data at two different energy levels, the dual-energy CT obtains the dual-energy projection data as follows:

$$p_1(B_1, B_2) = -\ln \int_0^{E_1} S_1(E) \exp[-B_1\mu_1(E) - B_2\mu_2(E)] dE \quad (13)$$

$$p_2(B_1, B_2) = -\ln \int_0^{E_2} S_2(E) \exp[-B_1\mu_1(E) - B_2\mu_2(E)] dE \quad (14)$$

Although, in theory, $(B_1, B_2)$ can be found out from the expressions (13) and (14) after the measurement of $(p_1, p_2)$, both of the above expressions cannot be solved analytically since they are logarithmic integration equations. Besides, the frequently-used nonlinear iterative solution requires a huge computation and has difficulty in finding a stable result.

The present inventor has noticed that, after the rays travel through the first base material of thickness $d_1$ and $d_2$ the second base material of thickness, the measured dual-energy projection data have the form of the following expressions (15) and (16):

$$p_1 = -\ln \int_0^{E_1} S_1(E) \exp[-d_1\mu_1(E) - d_2\mu_2(E)] dE \quad (15)$$

$$p_2 = -\ln \int_0^{E_2} S_2(E) \exp[-d_1\mu_1(E) - d_2\mu_2(E)] dE \quad (16)$$

As can be seen from the comparison between (13) (14) and (15) (16), the pair of projection values $(B_1, B_2)$ for base material coefficients will be exactly the same as the thickness combination $(d_1, d_2)$ of the base material if the measured pair of projection data $(p_1, p_2)$ is identical to $\{p_1(B_1, B_2), p_2(B_1, B_2)\}$.

Therefore, by measuring dual-energy projections of known materials with different combinations of thickness, the correspondence between the pair of dual-energy projection data $(p_1, p_2)$ and the pair of projection values $(B_1, B_2)$ of base material coefficients can be acquired, and thus the lookup table can be created.

During image reconstruction, the pair of dual-energy projection data $(p_1, p_2)$ is measured by scanning the object with dual-energy rays. Then, the lookup table is searched for the corresponding pair of projection values $(B_1, B_2)$ of base material coefficients based on the pair of dual-energy projection data $(p_1, p_2)$. Alternatively, if only an approximate pair of projection values $(B'_1, B'_2)$ of base material coefficients is found, the above pair of projection values $(B_1, B_2)$ of base material coefficients can be acquired by means of linear interpolation. Apparently, such calculation is much easier than that of solving a logarithmic equation.

FIG. 1 is a schematic diagram of a dual-energy CT system according to an embodiment of the present invention. As shown in FIG. 1, a ray source 100 generates dual-energy X-rays having a continuous energy distribution at predefined timing under the control of a controller 500. The object 200 is placed on a bearing mechanism 300, which can rotate uniformly and be lifted up and down under the control of the controller 500. An array of detectors 400 is arranged at a position opposite to the ray source 100, and receives the penetrative rays, which have traveled through the object 200, under the control of the controller 500 so as to obtain detection signals for a first energy level and detection signals for a second energy level. The signals detected by the detector array 400 are converted into digital signals and stored in a computer 600 for subsequent processing of calibration or reconstruction.

Figure 2:
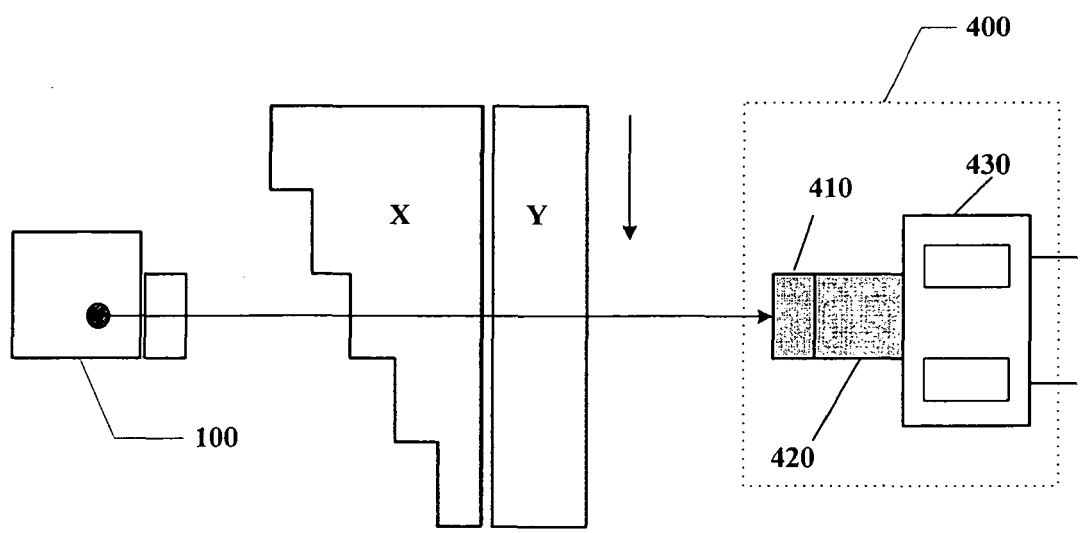
FIG. 2 is a schematic diagram for explaining a method for calibrating a dual-energy CT system according to an embodiment of the present invention.

FIG. 2 is a schematic diagram for explaining a method for calibrating a dual-energy CT system according to an embodiment of the present invention. FIG. 2 shows a two-layer structure used by the detector array, with a low-energy thinner crystal 410 being placed before a high-energy thicker crystal 420, the former mainly absorbing the low-energy portion of X-rays and the latter mainly absorbing the high-energy portion of X-rays. Signals detected by the low-energy and high-energy crystals 410 and 420 are converted into digital signals by an auxiliary circuit, such as A/D converter. In this way, the detector array 400 can output high- and low-energy signals separately.

Figure 3:
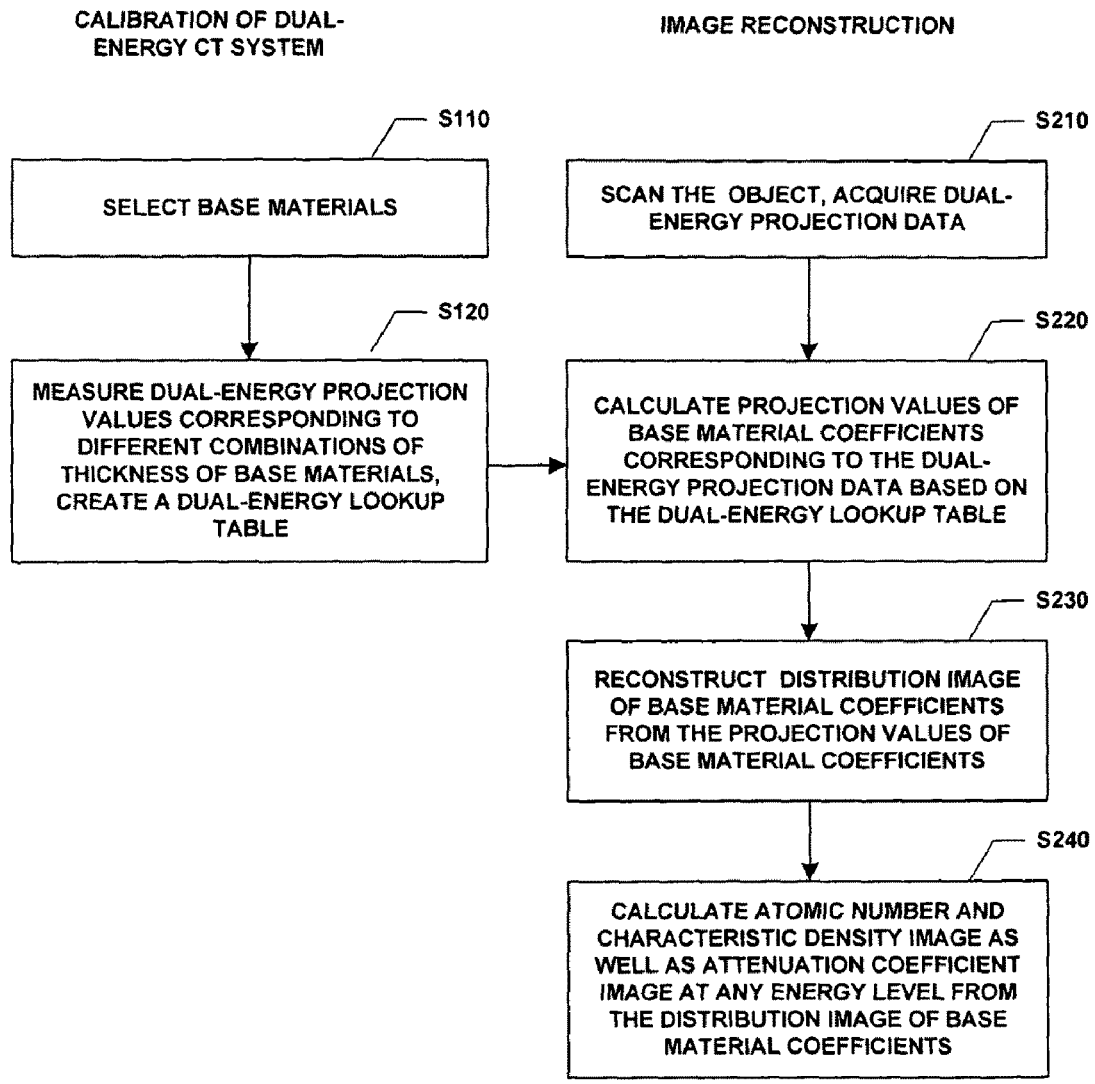
FIG. 3 is a flowchart depicting a method for calibrating a dual-energy CT system and an image reconstruction method according to an embodiment of the present invention.

FIG. 3 is a flowchart depicting a method for calibrating a dual-energy CT system and an image reconstruction method according to an embodiment of the present invention. The left part of FIG. 3 illustrates the procedure of calibrating the dual-energy CT system, and the right part illustrates the detail of the image reconstruction method.

Two types of common materials, such as carbon and aluminum, are selected as base materials X and Y in FIG. 2 (S110). One of the base materials, for example, carbon X, is formed in a step-shape, and the other base material, aluminum Y here, is used to make cuboids of various thickness. A corresponding pair of low- and high-energy projection values $(p_1, p_2)$ can be measured based on each pair of thickness values $(d_1, d_2)$ for the base materials.

With the geometrical arrangement in FIG. 2, the detector array 400 can measure and obtain dual-energy projection values corresponding to the combination of certain thickness of the base material Y and a serial of thickness of the base material X, respectively, while the base materials pass through the radiation area from top to bottom. The thickness of the base material Y is then changed, and the above measurement is repeated to obtain the dual-energy projection values of X and Y for respective combinations of thickness. All of the measurement results constitute the correspondence between the dual-energy projection values and the combinations of thickness for the base materials (S120).

In the process of inspection, the object is first placed on the bearing mechanism 300. Then, the controller 500 controls the ray source 200 to emit dual-energy X-rays, which radiate the object from all angles, and the pairs of dual-energy projection values are obtained by the detector array 400 (S210).

Next, the lookup table created above is utilized to compute a thickness combination $(d_1,d_2)$ corresponding to each of the pairs of dual-energy projection values, and thus a pair of projection values $(B_1,B_2)$ of the base material coefficients can be found (S220). Subsequently, an image of the distribution of the base material coefficients $b_1$ and $b_2$ can be acquired according to the CT reconstruction algorithm (S230).

Further, the obtained image of the base material coefficients is used to calculate the atomic number and characteristic density image of the object as well as its attenuation coefficient image at any energy level (S240).

The following numerical simulation experiment is conducted to verify the above reconstruction method. Given that the X-ray has a high voltage of 140 kV and the detector array uses CsI crystal, the energy spectrum and the energy response function of the detector are first simulated through Monte Carlo method, and the dual-energy projection values is computed analytically with the expression (9).

For example, carbon and aluminum are chosen as base materials, with atomic numbers being 6 and 13, mass numbers being 12.011 and 26.9815, densities being 1 $g/cm^3$ and 2.7 $g/cm^3$, and characteristic densities being 0.999084 $g/cm^3$ and 2.601783 $g/cm^3$, respectively. The material of carbon has a serial of thickness from 0 to 10 cm with an interval of 1 cm, and the material of aluminum has a serial of thickness from 0 to 1 cm with an interval of 0.1 cm. The expressions (15) and (16) are adopted to calculate dual-energy projection values for different combinations of thickness. Here, each of carbon and aluminum has 11 types of thickness, and thus a lookup table is formed with a size of 11×11.

FIG. 4 is a schematic cross-sectional diagram of an organic glass bottle full of water. The organic glass bottle full of water is used as the object, with its side wall having a thickness of 5 mm, the outer diameter being 160 mm and the inner diameter being 150 mm. Organic glass has atomic number of 6.56, density of 0.8 $g/cm^3$ and characteristic density of 0.863 $g/cm^3$. Water has atomic number of 7.51, density of 1.0 $g/cm^3$ and characteristic density of 1.11 $g/cm^3$.

In CT scanning, parallel beam scanning is used. The number of projection angles is 720, the number of detectors is 512, and the size of a reconstructed image is 512×512.

Figure 5E:
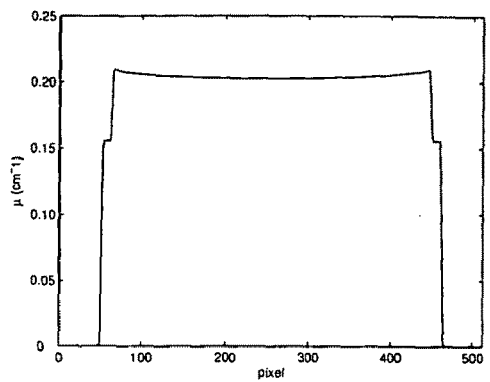
FIGS. 5E and 5F indicate respectively curves of pixel values extracted along the central lines of the images shown in FIGS. 5A and 5B.
Figure 5F:
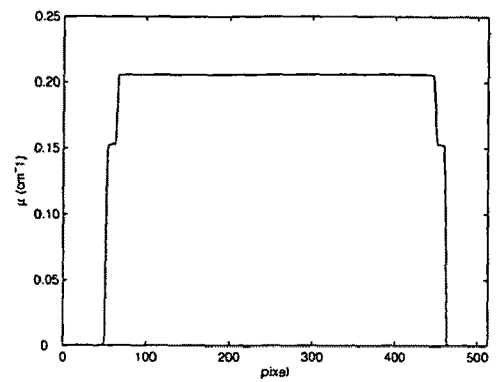

FIG. 5 shows the resulting images reconstructed by the prior art method and by the method of the present invention, in which FIG. 5A is a low-energy attenuation coefficient image reconstructed by a conventional method, FIG. 5B is attenuation coefficient image at 60 keV obtained by the image reconstruction method of the present invention, and the display gray windows for the images in FIGS. 5A and 5B are [0.12 0.21]; FIG. 5C is a characteristic density image reconstructed by the method of the present invention, with a display gray window of [0.6 1.12]; FIG. 5C is an atomic number image reconstructed by the method of the present invention, with a display gray window of [6 8]; FIGS. 5E and 5F indicate respectively curves of pixel values extracted along the central lines of the images shown in FIGS. 5A and 5B; FIGS. 5G and 5H indicate respectively curves of pixel values extracted along the central lines of the images shown in FIGS. 5C and 5D versus a curve for the actual values, where solid lines denote reconstruction results, and dashed lines denote actual values.

Figure 5G:
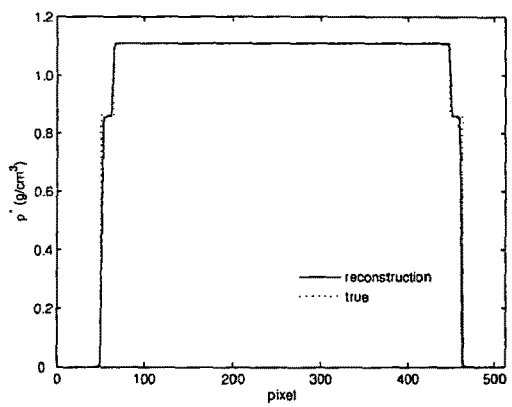
FIGS. 5G and 5H indicate respectively curves of pixel values extracted along the central lines of the images shown in FIGS. 5C and 5D versus a curve for an actual image, where solid lines denote reconstruction results, and dashed lines denote actual values.
Figure 5H:
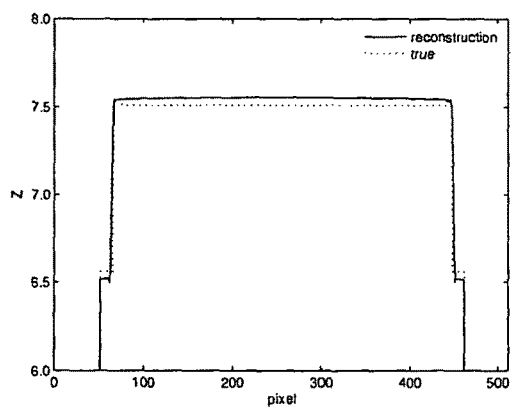

As can be seen from the comparison between FIGS. 5A and 5B as well as FIGS. 5C and 5D, the cupping artifact due to X-ray beam hardening can be removed from the attenuation coefficient images obtained through the method of the present embodiment. Furthermore, as shown in FIGS. 5G and 5H, the reconstruction results have little difference from the actual values, thereby suggesting that a higher precision can be achieved by the method according to the present invention.

In summary, the calibration method according to the embodiments of the present invention has a reduced complexity. To be specific, a dual-energy lookup table can be obtained by selecting base material, fabricating a step-shaped block and rectangular blocks having a series of thickness and measuring projection values under different combinations of thickness, in order to implement system calibration.

In addition, with the image reconstruction method according to the embodiments of the present invention, the obtained reconstruction result has a high precision. As can be seen from the simulation result, the values of atomic number and density have an error within 1%.

Further, with the method of the present invention, it is possible to acquire the attenuation coefficient image of the object at any energy level without any effect from X-ray beam hardening.

The foregoing description is only intended to illustrate the embodiments of the present invention other than limiting the present invention. For those skilled in the art, any change or substitution that can be made readily within the scope of the present invention should be encompassed by the scope of the present invention. Therefore, the scope of the present invention should be defined by the claims.

What is claimed is:

1. A method for reconstructing an image of an object under inspection, comprising:

scanning the object under inspection with dual-energy rays emitted from a dual-energy ray generator to acquire dual-energy projection values for the object;

using one or more processors of a computer to perform operations including:

calculating projection values of base material coefficients corresponding to said dual-energy projection values based on a pre-created lookup table;

reconstructing an image of base material coefficient distribution based on said projection values of base material coefficients; and calculating an atomic number image of said object based on said image of base material coefficient distribution to be displayed by a display;

wherein said lookup table is created by selecting at least two different materials, detecting penetrative rays from dual-energy rays penetrating said at least two different materials under different combinations of thickness to acquire projection values, and creating a lookup table in a form of correspondence between said different combinations of thickness and said projection values.

2. The image reconstruction method of claim 1, further comprising calculating a characteristic density image of said object based on said image of base material coefficient distribution.

3. The image reconstruction method of claim 1, further comprising calculating an attenuation coefficient image of said object based on said image of base material coefficient distribution.

4. The method of claim 1, wherein said dual-energy rays comprise low- and high-energy rays.

5. The method of claim 4, wherein said low- and high-energy rays are X-rays.

6. The method of claim 1, wherein said at least two different materials comprises carbon and aluminum.

* * * * *